(12) United States Patent
Ahn et al.

(10) Patent No.: US 12,245,724 B2
(45) Date of Patent: Mar. 11, 2025

(54) VACUUM BLENDER

(71) Applicant: Joung Geun Ahn, Ansan-si (KR)

(72) Inventors: Joung Geun Ahn, Ansan-si (KR); Byung Hyun An, Ansan-si (KR); Se Hee An, Ansan-si (KR); Kyung Soon Kim, Ansan-si (KR)

(73) Assignee: Joung Geun Ahn, Ansan-si (KR)

( * ) Notice: Subject to any disclaimer, the term of this patent is extended or adjusted under 35 U.S.C. 154(b) by 764 days.

(21) Appl. No.: 17/601,527

(22) PCT Filed: Apr. 3, 2020

(86) PCT No.: PCT/KR2020/004552
§ 371 (c)(1),
(2) Date: Oct. 5, 2021

(87) PCT Pub. No.: WO2020/204648
PCT Pub. Date: Oct. 8, 2020

(65) Prior Publication Data
US 2022/0175192 A1 Jun. 9, 2022

(30) Foreign Application Priority Data
Apr. 5, 2019 (KR) .................. 10-2019-0040151
Jan. 23, 2020 (KR) .................. 10-2020-0009265

(51) Int. Cl.
*A47J 43/00* (2006.01)
*A47J 43/046* (2006.01)
*A47J 43/07* (2006.01)

(52) U.S. Cl.
CPC ......... *A47J 43/046* (2013.01); *A47J 43/0716* (2013.01)

(58) Field of Classification Search
CPC ..................................... A47J 43/046
See application file for complete search history.

(56) References Cited

U.S. PATENT DOCUMENTS

| 2017/0086622 A1* | 3/2017 | Chung ............ A47J 43/0716 |
| 2017/0231431 A1* | 8/2017 | Maeng ............ A47J 43/0716 99/485 |
| 2018/0220829 A1* | 8/2018 | Zhang ............ A47J 43/0716 |

FOREIGN PATENT DOCUMENTS

| KR | 20-2016-0004201 U | 12/2016 |
| KR | 10-1849160 B1 | 5/2018 |
| KR | 10-1851526 B1 | 6/2018 |
| KR | 10-2063787 B1 | 1/2020 |

* cited by examiner

*Primary Examiner* — Anshu Bhatia

(57) ABSTRACT

The present disclosure relates to a vacuum blender, and more particularly, to a vacuum blender that may easily vacuum an external vacuum container in a state, in which a mixer container that accommodates foods is not separated from a body.
The vacuum blender of the present disclosure may easily vacuum an auxiliary container by connecting a vacuum pump to an auxiliary container disposed on an outside of a body by using a container connector while not separating a mixer container that accommodates foods from the body.

9 Claims, 17 Drawing Sheets

VACUUM BLENDER

TECHNICAL FIELD

The present disclosure relates to a vacuum blender, and more particularly, to a vacuum blender that may easily vacuum an external vacuum container in a state, in which a mixer container that accommodates foods is not separated from a body.

BACKGROUND ART

A mixer (blender) is one of electric appliances that are used in homes most widely today, and crushes foods such as fruits, vegetables, and grains finely by using mixer blades that are rotatably installed at a lower portion of a storage container to allow a user to take the foods after the foods are introduced into a mixer container.

Generally, foods that are crushing targets are introduced into a storage container of a mixer, the cover of the blender is closed, and rotary cutters are rotated by a motor that is rotated at a high speed, and in this process, many foams are generated while air in the storage container and the crushed food grains are mixed at a high speed.

For example, if fruits such as bananas or tomatoes are put into a blender to be crushed, a large number of foams are generated at upper portions of the fruit juice.

This means that the taste and texture of food has been lowered and the fiber textures of the fruits have been already oxidized and considerably destructed in the crushing process when the fruit juice is drunken.

Furthermore, when the foods are kept without immediately taken after being crushed, an oxidation process progresses more rapidly and destruction of fibers and nutrients is accelerated when the foods are kept while being exposed to the air, and the freshness of the foods deteriorates while the color of the foods is changed, and layer separation is caused between the air and the foods.

In this way, the foods crushed by the blender are not taken immediately, it is difficult to preserve the foods for a long time.

In order to solve the above-described problems, a vacuum blender designed to crush foods in a vacuum state has been developed.

A vacuum pump is mounted on the vacuum blender, and the vacuum pump is connected to a mixer container that accommodates foods through a tube, an air channel, a chamber, and the like, and thus may vacuum the interior of the mixer container by discharging the air in the interior of the vacuum container to the outside.

Meanwhile, when a separate auxiliary container is to be vacuumed by using the vacuum blender, conventionally, the mixer container is separated from the body or a location of the configuration for vacuuming the mixer container is changed, and then a container connector (a hose, a tube, and the like) is connected to a configuration connected to the vacuum pump.

In this way, conventionally, when the vacuum container that is present on the outside is to be vacuumed, a user has to separate the mixer container from the body or change the location of the configuration that connects the vacuum pump and the mixer container.

DISCLOSURE

Technical Problem

The present disclosure is made in an effort to solve the above-described problems, and provides a vacuum blender that may easily vacuum an external auxiliary container by connecting a container connector (a hose, a tube, and the like) to a vacuum pump mounted in an interior of a body while not separating a mixer container that accommodates foods from the body and not changing a location of a configuration of connecting the vacuum pump and the mixer container.

Technical Solution

According to an aspect of the present disclosure, a vacuum blender includes: a body, in which a motor is mounted in the interior thereof; a vacuum pump mounted in the interior of the body; a mixer container coupled to an upper portion of the body and configured to crush foods accommodated in an interior thereof; an air discharge part configured to communicate the vacuum pump and the interior of the mixer container, and configured to cause interior air in the mixer container to flow the vacuum pump to discharge the interior air to an outside during an operation of the vacuum pump; and a communication switching member having a first passage connected to the vacuum pump, a second passage connected to the interior of the mixer container through the air discharge part, and a third passage communicated with the outside, and selectively communicated with the first passage, the second passage, and the third passage, and the communication switching member is switched to a first mode, in which the first passage and the second passage are communicated with each other while the third passage is closed, in a state, in which the mixer container is coupled to the body, and a second mode, in which the first passage and the third passage are communicated with each other while the second passage is closed.

The interior air in the mixer container may flow to the vacuum pump through the air discharge part to be discharged to the outside during the operation of the vacuum pump in a state of the first mode, and exterior air may flow to the vacuum pump through the third passage and the first passage to be discharged to the outside during the operation of the vacuum pump in a state of the second mode.

The communication switching member may be converted to a third mode, in which all of the first passage, the second passage, and the third passage are communicated with each other.

The air discharge part may be communicated with the outside through the second passage and the third passage in a state of the third mode.

The communication switching member may include: a first housing having a hollow shape, having the first passage at a lower portion thereof, and having the second passage on a side surface thereof; a second housing, a lower portion of which is inserted into and mounted on the interior of the first housing, having the third passage at an upper portion thereof, and having an auxiliary passage selectively communicated with the second passage on a side surface of a lower portion thereof; and an opening/closing part mounted in the interior of the second housing and configured to open and close the third passage communicated with the outside, the first passage and the second passage may be converted to the first mode, in which they are communicated with each other, when the second passage and the auxiliary passage are communicated with each other while the opening/closing part closes the third passage, the first passage and the third passage may be converted to the second mode, in which they are communicated with each other when the third passage is opened by the opening/closing part while the communication of the second passage and the auxiliary passage is interrupted, and the second passage may be converted to the third mode, in which the second passage is communicated with the third passage when the third passage is opened by the opening/closing part while the communication of the second passage and the auxiliary passage is allowed.

The second housing may be mounted to be rotatable horizontally with respect to a vertical axis of the first housing, and the communication of the second passage and the auxiliary passage may be interrupted or allowed through rotation of the second housing with respect to the first housing.

A handle part may protrude on an outside of the second housing.

The second housing may be mounted to be movable vertically with respect to the first housing, and the communication of the second passage and the auxiliary passage may be interrupted or allowed through vertical movement of the second housing with respect to the first housing.

The direction switching member may further include: an elevation elastic member configured to elastically support the second housing upwards and compressed when the second housing is lowered.

The opening/closing part may include: an opening/closing door member configured to open and close the third passage; and an opening/closing spring configured to apply an elastic force such that the opening/closing door member closes the third passage, the opening/closing door member may close the third passage with the opening/closing spring in a free state, and the third passage may be opened to be communicated with the first passage when the opening/closing door member is lowered by an external force.

The opening/closing part may maintain a closed state of the third passage during the operation of the vacuum pump as the elastic force of the opening/closing spring is larger than a suction force due to the vacuum pump.

The air discharge part may include a tube to be connected to the mixer container, is formed in the mixer container in a form of an air channel to be communicated with the interior of the mixer container, or is formed in a form of a cover that covers the mixer container to form a chamber with the mixer container so as to communicate the vacuum pump and the interior of the mixer container.

The vacuum blender may further include: an auxiliary container disposed on an outside of the body; and a container connector, one end of which is connected to the auxiliary container, the container connector may push the opening/closing part to open the third passage when an opposite end of the container connector is connected to the third passage, and the auxiliary container and the vacuum pump may be communicated with each other by opening the third passage.

According to another aspect of the present disclosure, a vacuum blender includes: a body, in which a motor and a vacuum pump are mounted in an interior thereof; a mixer container coupled to an upper portion of the body and configured to accommodate foods in an interior thereof; a first air passage part, one end of which is communicated with the interior of the mixer container; a second air passage part, one end of which is communicated with the vacuum pump; and a container connector, one end of which is connected to an opposite end of the second air passage part, and an opposite end of the container connector may be selectively coupled to and communicated with a vacuum container or communicated with an opposite end of the first air passage part.

The vacuum blender may further include: an intermediate chamber formed in the body; and a sealing member configured to open and close an interior of the intermediate chamber to and from an outside, and the interior of the intermediate chamber may be interrupted from the outside and an opposite end of the container connector disposed in the interior of the intermediate chamber is communicated with an opposite end of the first air passage part in a state, in which the sealing member closes the interior of the intermediate chamber.

An opposite end of the first air passage part and an opposite end of the second air passage part may be formed in the interior of the intermediate chamber to be communicated with each other, an end of the container connector may be connected to an opposite end of the second air passage part in the interior of the intermediate chamber, and an opposite end of the container connector may be extracted from the intermediate chamber and may be coupled to or communicated with an external vacuum container, or may be disposed in the interior of the intermediate chamber to be communicated with an opposite end of the first air passage part through the intermediate chamber in a closed state of the sealing chamber.

An opposite end of the container connector and an opposite end of the first air passage part may be spaced apart from each other in a state, in which one end and an opposite end of the container connector are disposed in the interior of the intermediate chamber.

The vacuum blender may further include: a reel member, on which the container connector is wounded.

An opposite end of the container connector may be detachably coupled to and communicated with an opposite end of the first air passage part.

The vacuum blender may further include: an intermediate chamber formed in the body, an opposite end of the first air passage part and an opposite end of the second air passage part may be formed in the interior of the intermediate chamber to be communicated with each other, the container connector may be disposed in the interior of the intermediate chamber, and an opposite end of the container connector may be extracted from the intermediate chamber to be coupled to or communicated with an external vacuum container, or may be coupled to and communicated with the first air passage part in the interior of the intermediate chamber.

The vacuum blender may further include: a sealing member configured to open and close an interior of the intermediate chamber to and from an outside.

The first air passage part may be mounted in an interior of the body and one end thereof is communicated with the mixer container, an opposite end of the first air passage part may be exposed to an outside of the body, and an opposite end of the container connector may be detachably coupled to and communicated with an opposite end of the first air passage part exposed from the body to the outside.

According to another aspect of the present disclosure, a vacuum blender includes: a body, in which a motor and a vacuum pump are mounted in an interior thereof; a mixer container coupled to an upper portion of the body and configured to accommodate foods in an interior thereof; a first air passage part, one end of which is communicated with the interior of the mixer container; a second air passage part, one end of which is communicated with the vacuum pump; an intermediate chamber formed in the body, and in which an opposite end of the first air passage part and an opposite end of the second air passage part are communicated with an interior thereof; a sealing member configured to open and close the interior of the intermediate chamber to the outside; and a container connector detachably coupled to an opposite end of the second air passage part, and an opposite end of the first air passage part and an opposite end of the second air passage part are communicated with each other through the intermediate chamber in a state, in which the container connector is separated to deviate from the intermediate chamber and the sealing member is closed, and an opposite end of the container connector, one end of which is coupled to an opposite end of the second air passage part is coupled to and communicated with an external vacuum container.

Advantageous Effects

The vacuum blender of the present disclosure, which has been described above, may easily vacuum an auxiliary container by connecting a vacuum pump to an auxiliary container disposed on an outside of a body by using a container connector while not separating a mixer container that accommodates foods from the body.

BRIEF DESCRIPTIONS OF THE DRAWINGS

BEST MODE

First Embodiment

Figure 1:
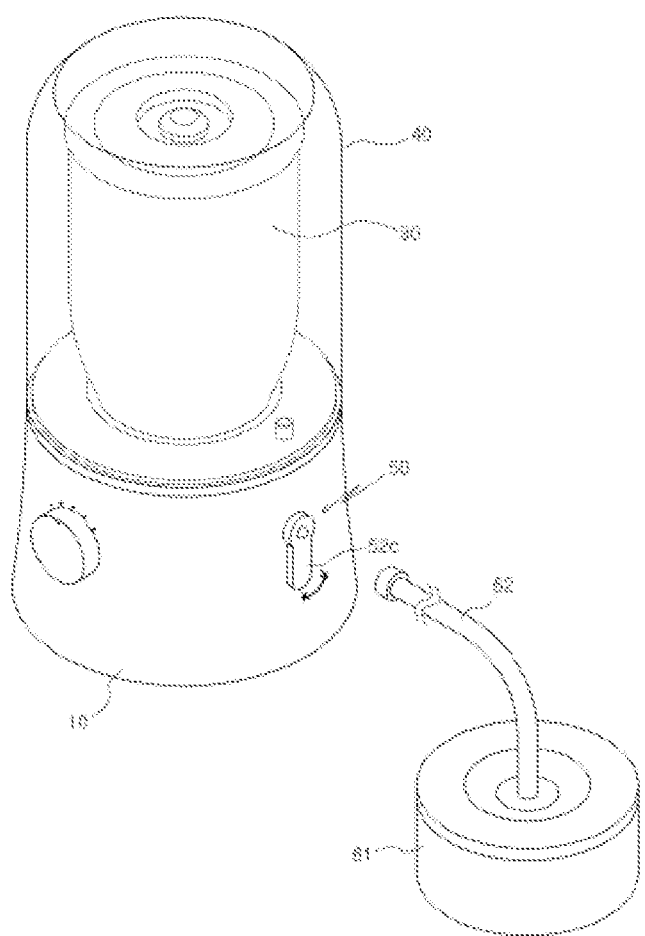
FIG. 1 is a perspective view of a vacuum blender according to a first embodiment of the present disclosure.
Figure 2:
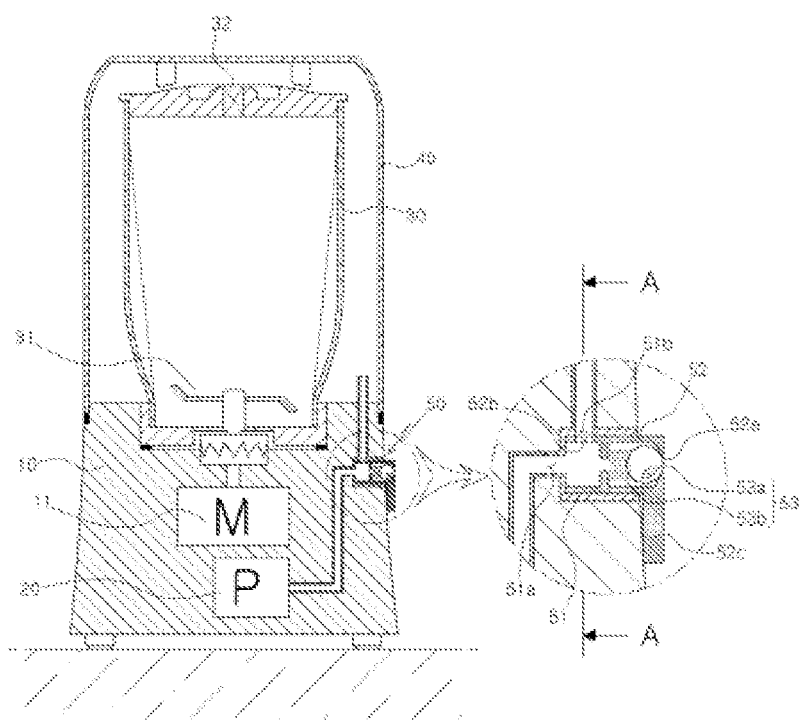
FIG. 2 is a cross-sectional view of the vacuum blender according to the first embodiment of the present disclosure.
Figure 3A:
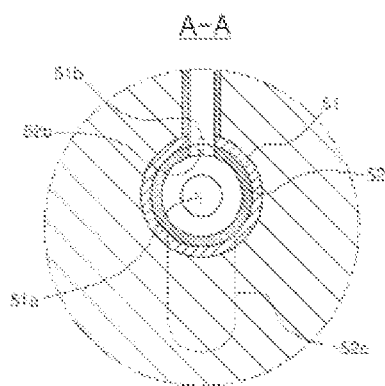
FIGS. 3A-3B are cross-sectional views according to a rotational state of a second housing, taken along line A-A of FIG. 2.
Figure 3B:
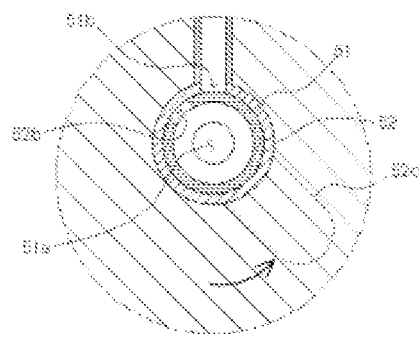
Figure 4:
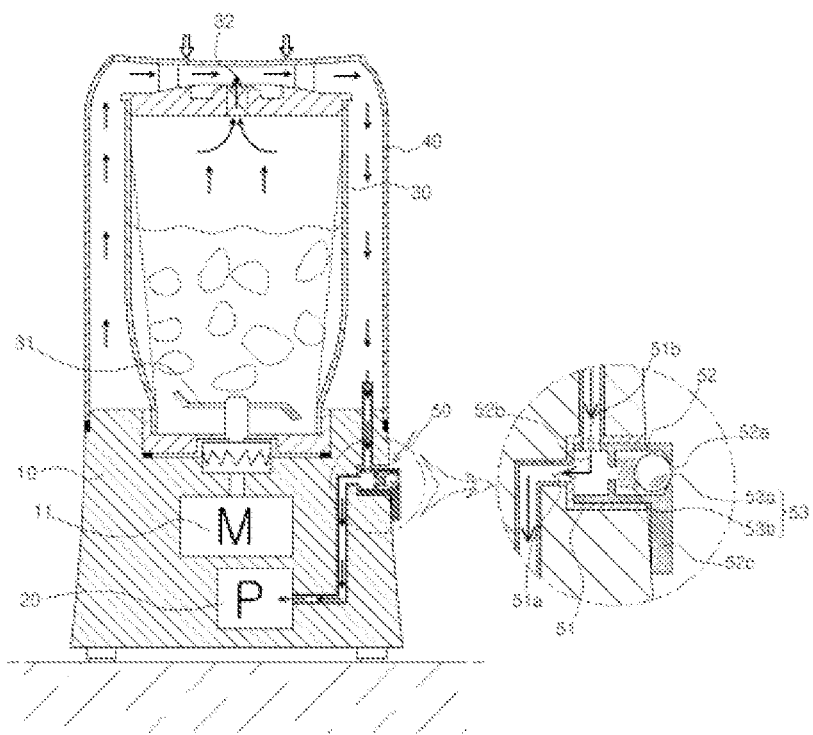
FIG. 4 is a cross-sectional view of a state, in which a mixer container is vacuumed in FIG. 2.
Figure 5:
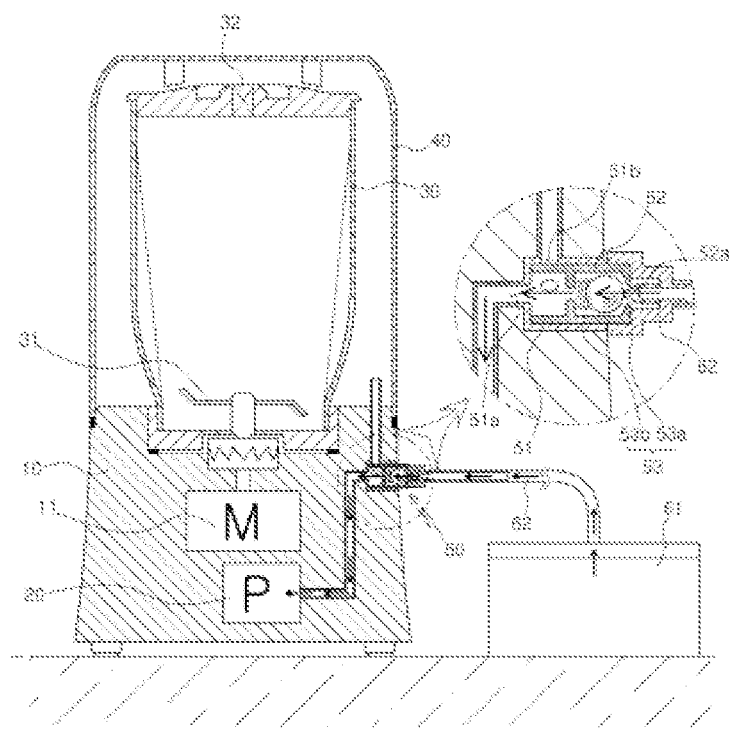
FIG. 5 is a cross-sectional view of a state, in which an auxiliary container is vacuumed in FIG. 2.
Figure 6:
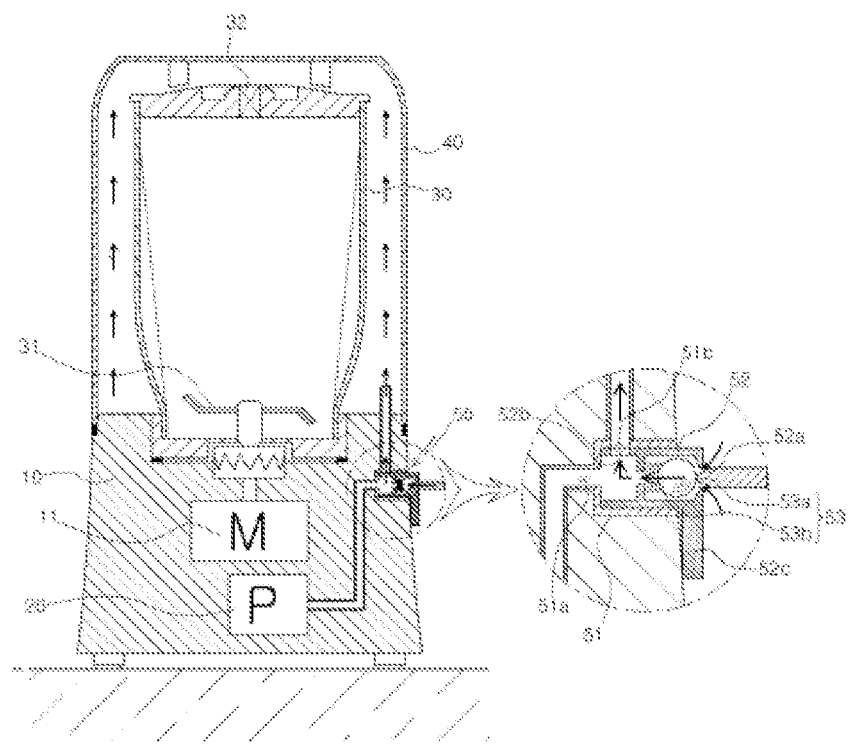
FIG. 6 is a cross-sectional view of a state, in which vacuum of the mixer container is released in FIG. 2.

FIG. 1 is a perspective view of a vacuum blender according to a first embodiment of the present disclosure. FIG. 2 is a cross-sectional view of the vacuum blender according to the first embodiment of the present disclosure. FIGS. 3A-3B are a cross-sectional view according to a rotational state of a second housing, taken along line A-A of FIG. 2. FIG. 4 is a cross-sectional view of a state, in which a mixer container is vacuumed in FIG. 2. FIG. 5 is a cross-sectional view of a state, in which an auxiliary container is vacuumed in FIG. 2. FIG. 6 is a cross-sectional view of a state, in which vacuum of the mixer container is released in FIG. 2.

The vacuum blender of the present disclosure, as illustrated in FIGS. 1 and 2, includes a body 10, a vacuum pump 20, a mixer container 30, an air discharge part 40, and a communication switching member 50.

A motor 11 is mounted in an interior of the body 10.

The vacuum pump 20 is mounted in the interior of the body 10.

The mixer container 30 is adapted to accommodate foods in an interior thereof, and is detachably coupled to an upper portion of the body 10 and a rotary cutter 31 is mounted in an interior of the mixer container 30 to crush the foods accommodated in the mixer container 30 through rotation of the rotary cutter 31 by the motor 11.

The air discharge part 40 communicates the vacuum pump 20 and the interior of the mixer container 30, and causes interior air in the mixer container 30 to flow to the vacuum pump 20 to discharge the interior air to an outside during an operation of the vacuum pump 20.

In the embodiment, the air discharge part 40 is formed in a form of a cover that covers the mixer container 30, and forms a chamber with the mixer container 30 to communicate the vacuum pump 20 and the interior of the mixer container 30.

Unlike the embodiment, the air discharge part 40 may include a tube to be connected to the mixer container 30, and may be formed in a form of an air chamber in the air discharge part 40 and the mixer container 30 to be communicated with the interior of the mixer container 30.

The tube type, in which the air discharge part 40 includes a tube, refers to a type of a structure that is disclosed in Korean Patent No. 10-1674164 as an example.

An air channel type, in which the air discharge part 40 is formed in the mixer container 30 in a form of an air channel, refers to a type of a structure that is disclosed in Korean Patent No. 10-1769482 as an example.

The air discharge part 40 may be a structure, in which the tube type and the air channel type, which have been described above, are combined.

The air discharge part 40 may have various configurations and structures, in addition to the above-described configurations, and any structure that connects the vacuum pump 20 and the mixer container 30, which are applied to a conventional known vacuum blender to cause air to flow is sufficient.

A check valve 32 is mounted at an upper portion of the mixer container 30, and is opened when the air in the interior of the mixer container 30 is to be compulsorily discharged to the outside, but is closed when the air is to be introduced into the interior of the mixer container 30.

Any check valve 32 having a conventional known configuration/structure is sufficient, and a detailed description thereof will be omitted.

According to occasions, the check valve 32 may be omitted.

The communication switching member 50 may have a first passage 51a, a second passage 51b, and a third passage 52a.

In the embodiment, the communication switching member 50 is mounted on the body 10, but the communication switching member 50 may be mounted at various locations according to the air passage part 40.

The first passage 11 is connected to the vacuum pump 20.

The second passage 51b is connected to an interior of the mixer container 30 through the air discharge part 40.

The third passage 52a is communicated with the outside.

The communication switching member 50 selectively communicate the first passage 51a, the second passage 51b, and the third passage 52a in a state, in which the mixer container 30 is coupled to the body 10.

The communication switching member 50 is converted to a first mode, a second mode, and a third mode in a state, in which the mixer container 30 is coupled to the body 10.

The first mode communicates the first passage 51a and the second passage 51b in a state, in which the third passage 52a communicated with the outside is closed.

Because the first passage 51a and the second passage 51b are communicated with each other during an operation of the vacuum pump 20 in a state of the first mode, the interior air of the mixer container 30 flows to the vacuum pump 20 through the air discharge part 40, the second passage 51b, and the first passage 51a to be discharged to the outside.

The second mode communicates the first passage 51a and the third passage 52a in a state, in which the second passage 51b communicated with the air discharge part 40 is closed.

Because the third passage 52a and the first passage 51a communicated with each other during an operation of the vacuum pump 20 in the state of the second mode, the exterior are flows to the vacuum pump 20 through the third passage 52a and the first passage 51a to be discharged to the outside.

When the auxiliary container 61 is disposed on an outside of the body 10, and the third passage 52a is opened by the second mode to be communicated with the first passage 51a and the second passage 51b is closed when an opposite end or the container connector 62 is connected to the third passage 52a in a state in which one end of the container connector 62 including a hose and the like is connected to the auxiliary container 61, the air in the interior of the auxiliary container 61 is discharged through the first passage 51a and the third passage 52a via the vacuum pump 20 to vacuum the interior of the auxiliary container 61 during an operation of the vacuum pump 20.

In the third mode, all of the first passage 51a, the second passage 51b, and the third passage 52a are communicated with each other.

Because the second passage 51b and the third passage 52a are communicated with each other in the state of the third mode, the air discharge part 40 is communicated with the outside through the second passage 51b and the third passage 52a.

Accordingly, the exterior air may be introduced into the air discharge part 40, and thus the vacuum of the air discharge part 40 is released.

The communication switching member 50 may include the first mode and the second mode without a third mode, and then, a separate vacuum releasing valve is mounted.

In order to the operation relationship, in the embodiment, the communication switching member 50, as illustrated in FIGS. 2 and 3, includes a first housing 51, a second housing 52, and an opening/closing part 53.

The first housing 51 has a hollow shape, and the first passage 51a connected to the vacuum pump 20 is formed at a lower portion thereof, and the second passage 51b connected to the air discharge part 40 is formed on a side surface thereof.

A lower portion of the second housing 52 is inserted into and mounted in the interior of the first housing 51, the third passage 52a communicated with the outside is formed at an upper portion thereof, and an auxiliary passage 52b selectively communicated with the second passage 51b formed in the housing 51 is formed on a side surface of a lower portion thereof.

A lower portion of the second housing 52 has a length, by which the second passage 51b formed in the first housing 51 may be blocked, and is inserted into and mounted in the interior of the first housing 51.

The second housing 52 is mounted to be horizontally rotatable about a vertical axis with respect to the first housing 51.

Accordingly, as illustrated in FIG. 3A, the second passage 51b is communicated with the auxiliary passage 52b through rotation of the second housing 52 with respect to the first housing 51, and as illustrated in FIG. 3B, the second housing 52 is rotated and a lower portion of the second housing 52 blocks the second passage 51b.

In this way, the first passage 51a and the second passage 51b are blocked when the second passage 51b and the auxiliary passage 52b are mutually blocked through rotation of the second housing 52, and the first passage 51a and the second passage 51b are communicated when the second passage 51b and the auxiliary passage 52b are mutually communicated with each other.

In order to easily rotate the second housing 52, a handle part 52c protrudes from the outside of the second housing 52.

The opening/closing part 53 is mounted in the interior of the second housing 52 to open and close the third passage 52a communicated with the outside.

As illustrated in FIG. 4, when the second passage 51b and the auxiliary passage 52b are communicated with each other in a state, in which the opening/closing part 53 closes the third passage 52a, the first passage 51a and the second passage 51b are converted to the first mode, in which they are communicated with each other.

Furthermore, as illustrated in FIG. 5, when the third passage 52a is opened by the opening/closing part 53 in a state, in which the communication of the second passage 51b and the auxiliary passage 52b are interrupted, the mode is converted to the second mode, in which the first passage 51a and the third passage 52a are communicated with each other.

Furthermore, as illustrated in FIG. 6, when the third passage 52a is opened by the opening/closing part 53 in a state, in which the second passage 51b and the auxiliary passage 52b are communicated with each other, the mode is converted to the third mode, in which the second passage 51b and the third passage 52a are communicated with each other.

The opening/closing part 53 that opens and closes the third passage 52a may have various structures.

In the embodiment, the opening/closing part 53 includes an opening/closing door member 53a and an opening/closing spring 53b.

The opening/closing door member 53a opens and closes the third passage 52a while contacting the third passage 52a.

In the embodiment, the opening/closing door member 53a has a ball shape, but may have various other shapes.

The opening/closing spring 53b applies an elastic force such that the opening/closing door member 53a closes the third passage 52a.

One of the opening/closing spring 53b is supported while contacting the opening/closing door member 53a and an opposite end thereof is supported while contacting the second housing 52 whereby the opening/closing door member 53a closes the third passage 52a in a free state.

Accordingly, the opening/closing door member 53a closes the third passage 52a by the opening/closing spring 53b, and when the opening/closing door member 53a is lowered by an external force, the third passage 52a is opened and is communicated with the first passage 51a.

The present disclosure, as described above, may further include an auxiliary container 61 disposed on an outside of the body 10, and a container connector 62, one end of which is connected to the auxiliary container 61.

Then, the container connector 62 may include a hose, a tube, and the like.

As illustrated in FIG. 5, the container connector 62 opens the third passage 52a by pushing the opening/closing part 53 when an opposite end of the container connector 62 is connected to the third passage 52a, and the auxiliary container 61 may be vacuumed during an operation of the vacuum pump 20 as the auxiliary container 61 and the vacuum pump 20 are communicated with each other by opening the third passage 52a.

The communication switching member 50 for implementing the operation relationship may include, in addition to the configuration and structures of the above-described embodiment, all constructions and structures that may convert the mode into the first mode and the second mode by providing the first passage 51a, the second passage 51b, and the third passage 52a and selectively communicating the passages 51a, 51b, and 52a.

Hereinafter, an operational process of the present disclosure including the above configuration will be described.

When foods are introduced into the mixer container 30 to be vacuum-crushed, as illustrated in FIG. 4, the communication switching mode 50 is converted to the first mode.

That is, the user rotates the second housing 52 while gripping the handle part 52c such that the mode is converted to the first mode.

The, in a state, in which the third passage 52a is closed, the first passage 51a and the second passage 51b are communicated with each other through the auxiliary passage 52b.

When the vacuum pump 20 is operated in the state, the air in the interior of the mixer container 30 flows to the vacuum pump 20 through the air discharge part 40, the second passage 51b, the auxiliary passage 52b, and the first passage 51a.

Accordingly, the foods may be crushed in a vacuum state by operating the rotary cutter 31 in a state, in which the interior of the mixer container 30 is vacuumed.

Then, an elastic force of the opening/closing spring 53b that constitutes the opening/closing part 53 is made to be larger than a suction force of the vacuum pump 20 whereby the opening/closing part 53 maintains the closed state of the third passage 52a during an operation of the vacuum pump 20.

That is, the opening/closing door member 53a is allowed to have a force, by which the third passage 52a is closed without being opened, even by the suction force of the vacuum pump 20, that is, a vacuum pressure.

When the vacuum of the air discharge part 40 is released after the vacuum crushing is completed, as illustrated in FIG. 6, the communication switching member 50 is converted to the third mode.

That is, the third passage 52a is opened by using the opening/closing part 53.

Then, the exterior air flows to the air discharge part 40 through the third passage 52a, the auxiliary passage 52b, and the second passage 51b and the vacuum in the interior of the air discharge part 40 is released.

When the communication switching member 50 does not have the third mode, the vacuum of the air discharge part 40 is released by using the vacuum releasing valve.

Furthermore, when the auxiliary container 61 disposed on the outside of the body 10 is to be vacuumed, as illustrated in FIG. 5, the communication switching member 50 is converted to the second mode without separating the mixer container 30 from the body 10.

That is, in a state, in which the mixer container 30 is coupled to the body 10 without being separated from the body 10, the mode is converted to the second mode, in which a lower portion of the second housing 52 interrupts the communication of the first passage 51a and the second passage 51b by rotating the second housing 52 that constitutes the communication switching member 50.

When an opposite end of the container connector 62 is connected to the third passage 52a, an opposite end of the container connector 62 pushes the opening/closing part 53 to open the third passage 52a.

In this state, during an operation of the vacuum pump 20, the air in the interior of the auxiliary container 61 connected through the exterior air of the third passage 52a, that is, through the container connector 62 is discharged to the outside through the vacuum pump 20 after passing through the third passage 52a and the first passage 51a.

The present disclosure may easily vacuum the auxiliary container 61 by connecting the vacuum pump 20 to the auxiliary container 61 disposed on the outside of the body 10, without separating the mixer container 30, in which the foods are accommodated, from the body 10 by using the communication switching member 50, or in a state, in which a location of the air discharge part 40 that is a configuration for discharging the air in the interior of the mixer container to the outside by connecting the interior of the mixer container 30 and the vacuum pump 20.

Second Embodiment

Figure 7:
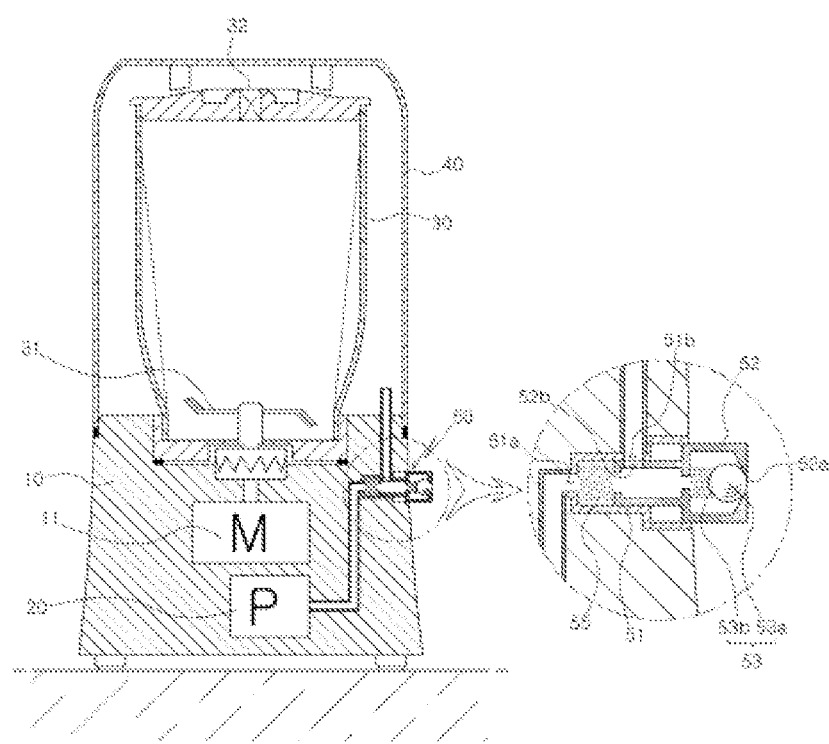
FIG. 7 is a cross-sectional view of a vacuum blender according to a second embodiment of the present disclosure.
Figure 8:
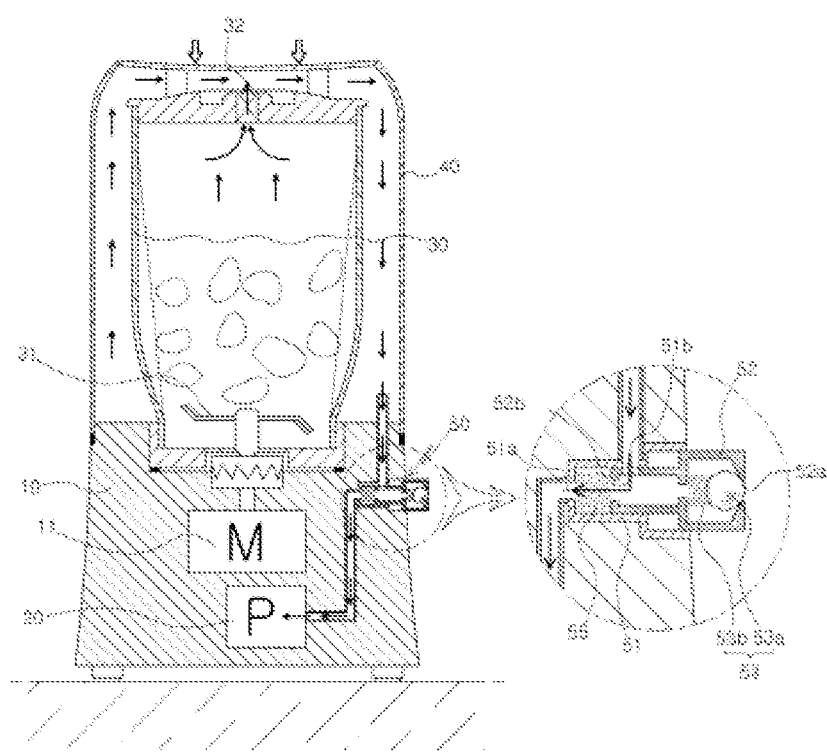
FIG. 8 is a cross-sectional view of a state, in which a mixer container is vacuumed in FIG. 7.
Figure 9:
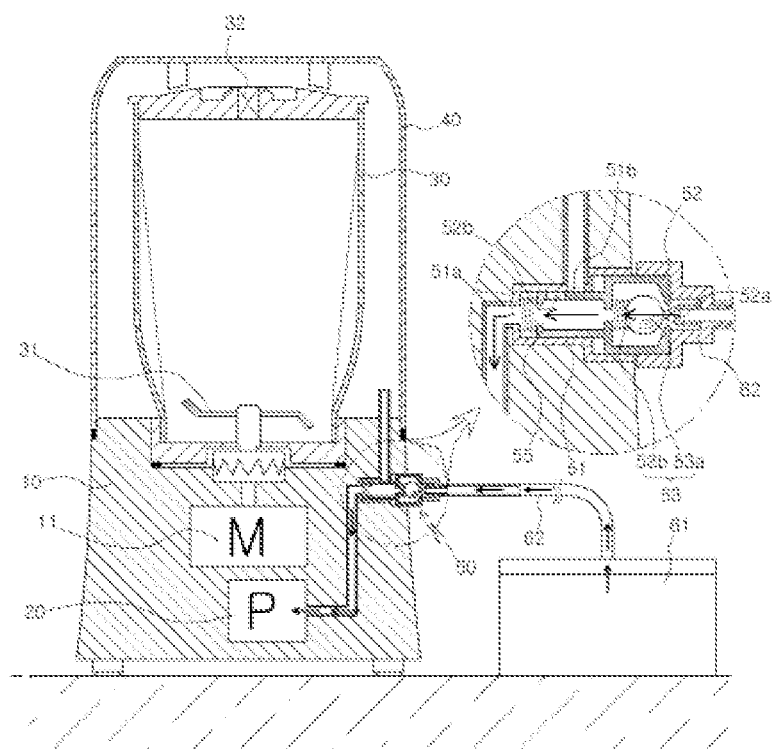
FIG. 9 is a cross-sectional view of a state, in which an auxiliary container is vacuumed in FIG. 7.
Figure 10:
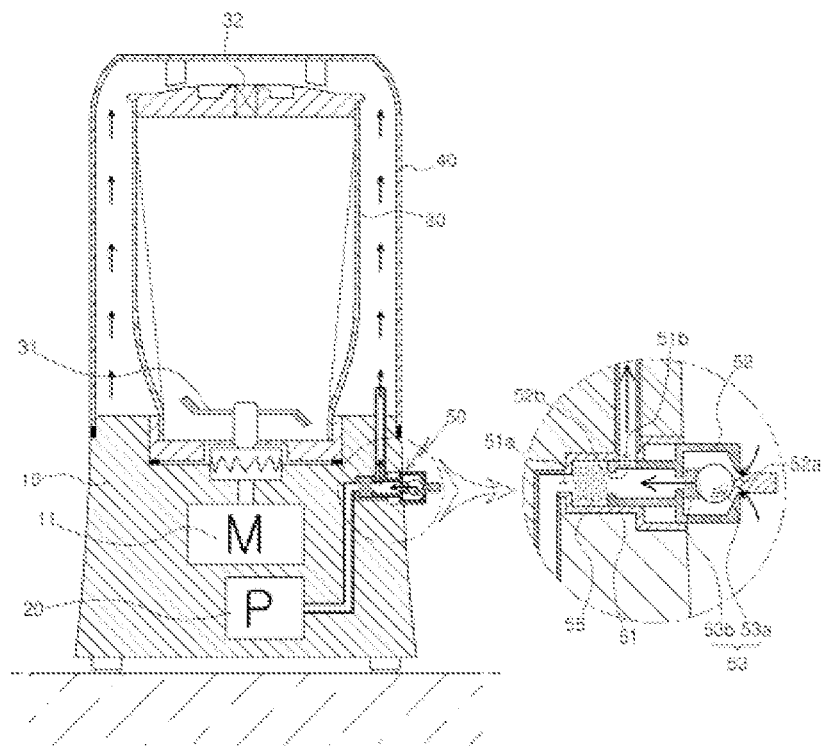
FIG. 10 is a cross-sectional view of a state, in which vacuum of the mixer container is released in FIG. 7.

FIG. 7 is a cross-sectional view of a vacuum blender according to a second embodiment of the present disclosure. FIG. 8 is a cross-sectional view of a state, in which a mixer container is vacuumed in FIG. 7. FIG. 9 is a cross-sectional view of a state, in which an auxiliary container is vacuumed in FIG. 7. FIG. 10 is a cross-sectional view of a state, in which vacuum of the mixer container is released in FIG. 7.

The second embodiment is different from the first embodiment in an operational structure of the second housing 52, and the difference will be mainly described.

As illustrated in FIGS. 7 to 10, the second housing 52 is mounted to be movable upwards and downwards with respect to the first housing 51.

Through the upward/downward movement of the second housing 52 with respect to the first housing 51, the second passage 51b formed in the first housing 51 and the auxiliary passage 52b formed in the housing 52 may be interrupted or communicated with each other.

When the first housing 51 and the second housing 52 are disposed horizontally as illustrated in the drawings, the first housing 51 is moved horizontally with respect to the second housing 52.

Both of the upward movement and the downward movement of the second housing 52 with respect to the first housing 51 may be manually made.

Further, the upward movement and the downward movement of the second housing 52 with respect to the first housing 51 may be made semi-automatically or automatically.

The direction conversion member may further include an elevation elastic member 55 that elastically supports the second housing 52 upwards and is compressed when the second housing 52 is lowered.

The first passage 51a formed in the first housing 51 and the auxiliary passage 52b formed in the second housing 52 are communicated or interrupted while the elevation elastic member 55 is compressed or expanded through the upward/downward movement of the second housing 52, whereby ultimately, the first passage 51a and the second passage 51b may communicated with each other or interrupted.

The elevation elastic member 55 may simply include only a spring, or may include a known repetitive push button such that the second housing 52 may repeatedly maintain a lowered state or a raised state whenever the second housing 52 is repeatedly pushed.

In this way, when the elevation elastic member 55 is a repetitive push button, a user may convert the mode to the first mode and the second mode by pushing the repetitive push button.

In the embodiment, as illustrated in FIGS. 7 and 8, the second passage 51b and the auxiliary passage 52b are communicated with each other in the free state by the elastic member of the elevation elastic member 55, whereby the first passage 51a and the second passage 51b are communicated with each other.

Furthermore, when the second housing 52 is moved by an external force, that is, is moved to an inner side of the second housing 51 as illustrated in FIG. 9, the second housing 52 blocks the second passage 51b to interrupt the communication of the first passage 51a and the second passage 51b.

Unlike this, the present disclosure may be modified to a structure, in which the first passage 51a and the second passage 51b are interrupted in the free state, and the first passage 51a and the second passage 51b are communicated with each other by an external force.

Hereinafter, an operational process of the present disclosure including the above configuration will be described.

When foods are introduced into the mixer container 30 to be vacuum-crushed, as illustrated in FIG. 8, the communication switching mode 50 is converted to the first mode.

In the embodiment, because the second housing 52 is raised by the elevation elastic member 55 in the free state and then, the auxiliary passage 52b and the second passage 51b are communicated with each other, the first mode, in which the first passage 51a and the second passage 51b are communicated with each other through the auxiliary passage 52b in the free state, in which an external force is not applied.

When the vacuum pump 20 is operated in the state, the air in the interior of the mixer container 30 flows to the vacuum pump 20 through the air discharge part 40, the second passage 51b, the auxiliary passage 52b, and the first passage 51a.

Accordingly, the foods may be crushed in a vacuum state by operating the rotary cutter 31 in a state, in which the interior of the mixer container 30 is vacuumed.

Then, the elastic force of the opening/closing spring 53b that constitutes the opening/closing part 53 has a force, by which the opening/closing door member 53a does not open the third passage 52a but closes the third passage 52a even with a vacuum pressure due by the vacuum pump 20.

When the vacuum of the air discharge part 40 is released after the vacuum crushing is completed, as illustrated in FIG. 9, the communication switching member 50 is converted to the third mode.

That is, the third passage 52a is opened by using the opening/closing part 53.

Then, the exterior air flows to the air discharge part 40 through the third passage 52a, the auxiliary passage 52b, and the second passage 51b and the vacuum in the air discharge part 40 is released.

Without the third mode, the vacuum of the air discharge part 40 is released by using the vacuum releasing valve.

Furthermore, when the auxiliary container 61 disposed on the outside of the body 10 is to be vacuumed, as illustrated in FIG. 10, the communication switching member 50 is converted to the second mode without separating the mixer container 30 from the body 10.

That is, in a state, in which the mixer container 30 is coupled to the body 10 without being separated from the body 10, the mode is converted to the second mode, in which a lower portion of the second housing 52 interrupts the communication of the first passage 51a and the second passage 51b by pushing and lowering the second housing 52 that constitutes the communication switching member 50.

When an opposite end of the container connector 62 is connected to the third passage 52a, an opposite end of the container connector 62 pushes the opening/closing part 53 to open the third passage 52a.

In this state, during an operation of the vacuum pump 20, the air in the interior of the auxiliary container 61 connected through the exterior air of the third passage 52a, that is, through the container connector 62 is discharged to the outside through the vacuum pump 20 after passing through the third passage 52a and the first passage 51a.

The present disclosure may easily vacuum the auxiliary container 61 by connecting the vacuum pump 20 to the auxiliary container 61 disposed on the outside of the body 10, without separating the mixer container 30, in which the foods are accommodated, from the body 10 by using the communication switching member 50, or in a state, in which a location of the air discharge part 40 that is a configuration for discharging the air in the interior of the mixer container to the outside by connecting the interior of the mixer container 30 and the vacuum pump 20.

The other items are the same as or similar to the first embodiment, and a detailed description thereof will be omitted.

Third Embodiment

Figure 11:
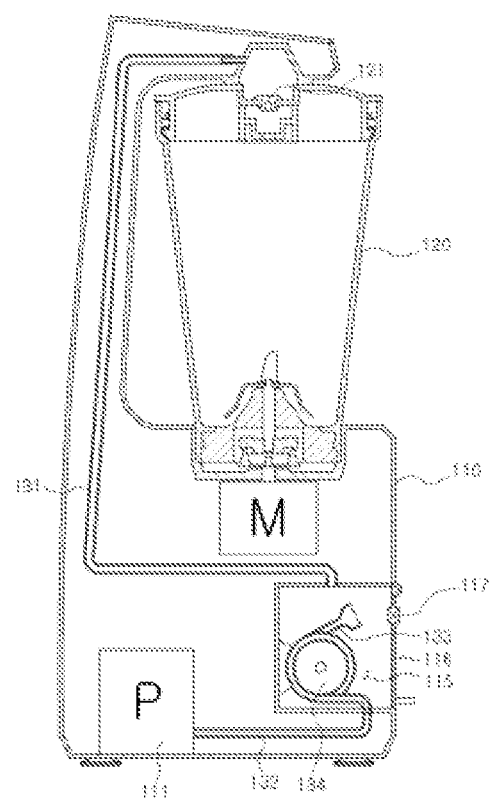
FIG. 11 is a cross-sectional view of a vacuum blender according to a third embodiment of the present disclosure.
Figure 12:
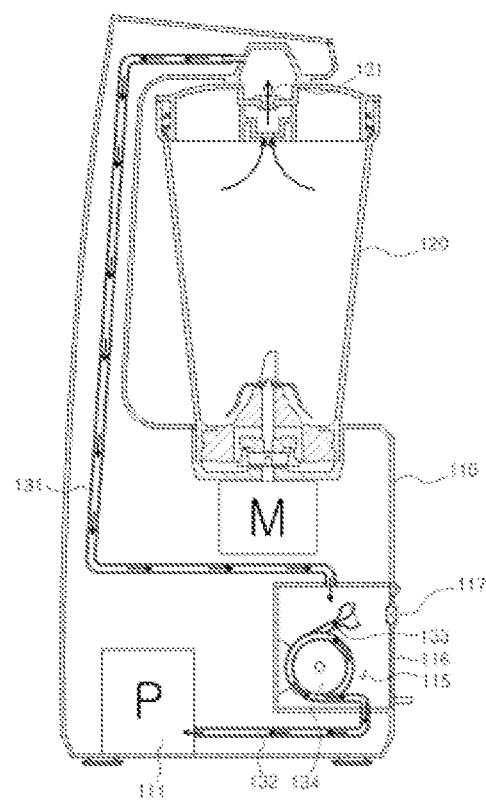
FIG. 12 is a cross-sectional view illustrating a process of vacuuming a mixer container by using a vacuum blender according to the third embodiment of the present disclosure.
Figure 13:
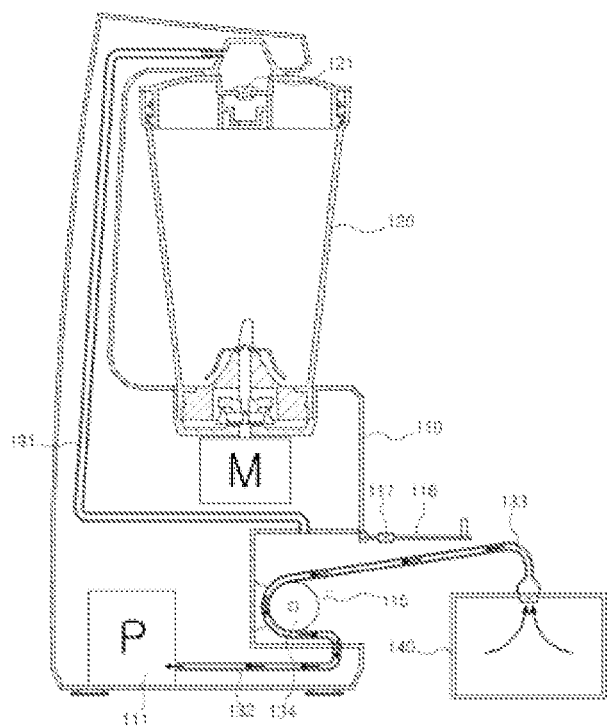
FIG. 13 is a cross-sectional view illustrating a process of vacuuming an external vacuum container by using the vacuum blender according to the third embodiment of the present disclosure.

FIG. 11 is a cross-sectional view of a vacuum blender according to a third embodiment of the present disclosure. FIG. 12 is a cross-sectional view illustrating a process of vacuuming a mixer container by using a vacuum blender according to the third embodiment of the present disclosure. FIG. 13 is a cross-sectional view illustrating a process of vacuuming an external vacuum container by using the vacuum blender according to the third embodiment of the present disclosure.

The vacuum blender of the present disclosure includes a body 110, a mixer container 120, a first air passage part 131, a second air passage part 132, and a container connector 133.

A motor and a vacuum pump 111 is mounted in an interior of the body 110.

The mixer container 120 is coupled to an upper portion of the body 110, foods are accommodated in an interior thereof.

A cutter for crushing foods is mounted in the interior of the mixer container 120.

A check valve 121 for maintaining a vacuum state and for vacuum-keeping is mounted at an upper portion of the mixer container 120 and a conventional known structure is sufficient as a structure of the check valve, a detailed description thereof will be omitted.

One end of the first air passage part 131 is communicated with an interior of the mixer container 120.

One end of the first air passage part 131 may be directly connected to the mixer container 120 to be communicated with the interior of the mixer container 120, and may be indirectly communicated with the interior of the mixer container 120 through another configuration.

Although it is illustrated in the drawings of the embodiment that the first air passage part 131 has a tube shape, it may have other passage shapes and structures, in addition to the tube shape.

That is, any first air passage part 131, one end of which is communicated with the interior of the mixer container 120, is sufficient regardless of a shape, a material, and a structure thereof.

Furthermore, it is illustrated in the drawings of the embodiment that a support is formed at an upper portion of the body 110 and the first air passage part 131 is mounted in the interiors of the body 110 and the support to be communicated with the interior of the mixer container 120 through an upper portion of the mixer container 120.

However, the first air passage part 131 may be applied to all of vacuum blenders having various structures, in addition to those illustrated in the drawings of the embodiment.

For example, in the vacuum blender, in which a cover that covers an upper portion of the mixer container 120 and vacuuming is made through an empty space between the mixer container 120 and the cover, one end of the first air passage part 131 is communicated with the space formed between the cover and the mixer container 120 to be communicated with the interior of the mixer container 120 through an inner space of the cover.

Furthermore, in the vacuum blender, in which a cover that covers an upper portion of the mixer cover 120 is provided and a separate passage is formed in the cover to be connected to the interior of the mixer container 120, one end of the first air passage part 131 is connected to a passage separately formed in the cover to be communicated with the interior of the mixer container 120.

In this way, in the present disclosure, any first air passage part 131 that is applied to a vacuum blender having various shapes and structure, and one end of which may be directly and indirectly communicated with the interior of the mixer container 120, is sufficient.

One end of the second air passage part 132 is communicated with the mixer container 111.

Although it is illustrated in the drawings of the embodiment that the second air passage part 132 has a tube shape, it may have other passage shapes and structures, in addition to the tube shape.

One end of the container connector 133 is connected to an opposite end of the second air passage part 132.

One end of the container connector 133 may be fixedly coupled to or detachably coupled to or connected to an opposite end of the second air passage part 132, or may be connected to the opposite end of the second air passage part 132 through another separate medium.

The opposite end of the container connector 133 is selectively coupled to and communicated with the external vacuum container 140 or communicated with the opposite end of the first air passage part 131 communicated with the mixer container 120.

In the drawings of the embodiment, any container connector 133 that performs the above functions while having a tube shape may be formed of other various shapes and materials.

In the embodiment, an intermediate chamber 115 is formed in the body 110, and a sealing member 116 that opens and closes the interior of the intermediate chamber 115 to and from the outside is provided.

The container connector 133 is disposed in the interior of the intermediate chamber 115.

The sealing member 116 may have various structures, such as a rotation opening/closing type, a sliding opening/closing type, and a detachment opening/closing type, and an interior of the intermediate chamber 115 may be sealed by the sealing member 116.

The sealing member 116 may include a door form or a drawer form as in the drawings of the embodiment, and any sealing member 115 that may open and close an interior of the intermediate chamber 115 to and from the outside through an operation thereof is sufficient.

Then, a sealant is disposed between the sealing member 116 and the intermediate chamber 115 such that the interior of the intermediate chamber 115 is completely sealed from the outside when the sealing member 116 closes the intermediate chamber 115.

A release valve 117 for releasing the vacuum in the interior of the intermediate chamber 115 is mounted on the sealing member 116.

The release valve 117 may be mounted at a site other than the sealing member 116 to release the vacuum in the interior of the intermediate chamber 115.

An opposite end of the first air passage part 131 and an opposite end of the second air passage part 132 are formed in the interior of the intermediate chamber 115 to be communicated with each other.

An end of the container connector 133 is connected to an opposite end of the second air passage part 132 in the interior of the intermediate chamber 115.

Furthermore, an opposite end of the container connector 133 is extracted from the interior of the intermediate chamber 115 to the outside to be coupled to and communicated with the external vacuum container 140, or is disposed in the interior of the intermediate chamber 115 to be communicated with the opposite end of the first air passage part 131 through the intermediate chamber 115 in a state, in which the sealing member 116 is closed.

That is, in a state, in which the container connector 133 is disposed in the interior of the intermediate chamber 115, the opposite end of the container connector 133 becomes an opened free end and is communicated with the opposite end of the first air passage part 131 through the intermediate chamber 115.

That is, in a state, in which both of one end and an opposite end of the container connector 133 are disposed in the interior of the intermediate chamber 115, the opposite end of the container connector 133 is spaced apart from the opposite end of the first air passage part 131, and is communicated with the first air passage part 131 through the intermediate chamber 115.

Accordingly, in a state, in which the sealing member 116 is closed such that the interior of the intermediate chamber 115 is interrupted from the outside and is sealed, the opposite end of the first air passage part 131 is communicated with the vacuum pump 111 through the intermediate chamber 115, the opposite end and the one end of the container connector 133, and the second air passage part 132.

Then, the liquid and the like introduced together with air through the opposite end of the first air passage part 131 are not introduced immediately to the opposite end of the container connector 133 and are stacked in the intermediate chamber 115, and the liquid and the like that are stacked in the intermediate chamber 115 may be easily cleaned later by a user to be removed.

Furthermore, when the one end of the container connector 133 is detachably mounted on the opposite end of the second air passage part 132, the opposite end of the first air passage part 131 and the opposite end of the second air passage part 132 are made to be communicated with each other without the container connector 133, by separating the one end of the container connector 133 from the opposite end of the second air passage part 132 and closing the sealing member 116.

In this way, according to the present disclosure, when the opposite end of the container connector disposed in the interior of the intermediate chamber 115 is communicated with the opposite end of the first air passage part 131 while the interior of the intermediate chamber 115 is interrupted in a state, in which the sealing member 116 closes the interior of the interior chamber 115, various structures in addition to the structure of the embodiment may be applied.

Furthermore, the present disclosure may further include a reel member 134, on which the container connector 133 accommodated in the intermediate chamber 115 may be wound.

The reel member 134 may be automatic or manual.

Of course, the container connector 133 itself may have a coil shape, a length of which may be extended without using the reel member 134 to be easily accommodated in the interior of the intermediate chamber 115, and the container connector 133 may be wound without the reel member 134 to be kept in the interior of the intermediate chamber 115.

According to the present disclosure, because the container connector 133 having a tube shape is not kept separately from the vacuum blender and is inserted into and kept in the interior of the intermediate chamber 115 formed in the body 110, there is no danger of loss and the container connector 133 is easily kept.

Hereinafter, an operational method and the like of the present disclosure including the above configuration will be described.

When the interior of the mixer container 120 is to be vacuumed, as illustrated in FIG. 12, the sealing member 116 is closed after the opposite end of the container connector 133 is disposed in the interior of the intermediate chamber 115.

Then, the interior of the mixer container 120 is communicated with the vacuum pump 111 through the first air passage part 131, the intermediate chamber 115, the container connector 133, and the second air passage part 132.

Accordingly, during the operation of the vacuum pump 111, the air in the interior of the mixer container 120 is discharged to the outside through the vacuum pump 111, and the interior of the mixer container 120 is vacuumed.

Then, some residuals of the foods may flow along the first air passage part 131 together with the air while the air is introduced from the mixer container 120 to the intermediate chamber 115, and according to the present disclosure, because the opposite end of the container connector 133 is spaced apart from the opposite end of the first air passage part 131, the residuals discharged through the opposite end of the first air passage part 131 do not flow immediately to the container connector 133 and are stacked in the interior of the intermediate chamber 115.

Accordingly, the user may easily remove the residuals accumulated in the intermediate chamber 115, and through this, the vacuum pump 111 may be prevented from being damaged due to the residuals introduced into the vacuum pump 111.

Furthermore, when the vacuum container 140 that is present on the outside is to be vacuumed, the sealing member 116 is opened after the vacuum in the interior of the intermediate chamber 115 is released by using the release valve 117.

Then, when the vacuum in the interior of the intermediate chamber 115 is released, the interior of the mixer container 120 is maintained in the vacuum state while the check valve 121 mounted at an upper portion of the mixer container 120 is automatically closed.

Thereafter, as illustrated in FIG. 13, the container connector 133 disposed in the intermediate chamber 115 is extracted and the opposite end of the container connector 1'33 is connected to the vacuum container 140, and the vacuum container 140 may be easily vacuumed by operating the vacuum pump 111.

Meanwhile, when the one end of the container connector 133 is detachably mounted on the opposite end of the second air passage part 132, the vacuum pump 111 may be operated in a state, in which the interior of the intermediate chamber 115 is sealed by the sealing member 116 after the container connector 133 is separated from the second air passage part 132 and is extracted to the outside of the intermediate chamber 115.

Then, the air in the interior of the mixer container 120 flows to be discharged to the vacuum pump 111 through the first air passage part 131, the intermediate chamber 115, and the second air passage part 132.

In this way, the present disclosure may easily vacuum the vacuum container 140 that is separately present on the outside while vacuuming the interior of the mixer container 120 of the vacuum blender.

Fourth Embodiment

Figure 14:
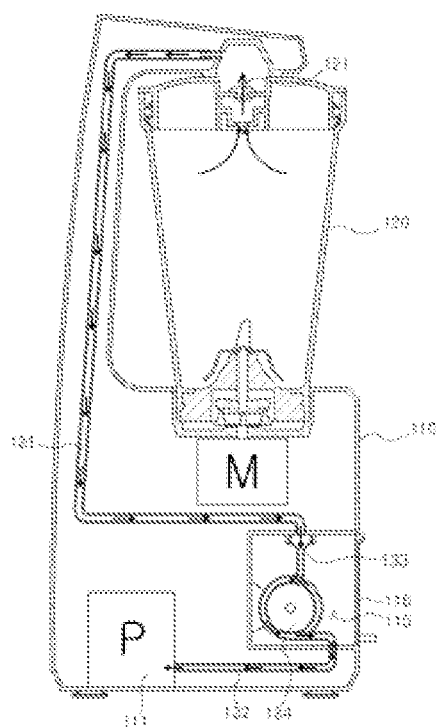
FIG. 14 is a cross-sectional view illustrating a process of vacuuming a mixer container by using a vacuum blender according to the fourth embodiment of the present disclosure.
Figure 15:
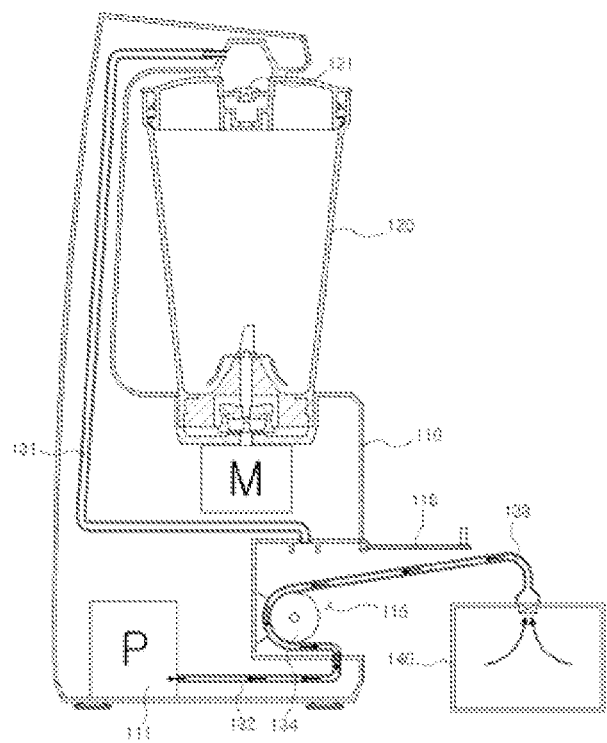
FIG. 15 is a cross-sectional view illustrating a process of vacuuming an external vacuum container by using the vacuum blender according to the fourth embodiment of the present disclosure.

FIG. 14 is a cross-sectional view illustrating a process of vacuuming a mixer container by using a vacuum blender according to the fourth embodiment of the present disclosure. FIG. 15 is a cross-sectional view illustrating a process of vacuuming an external vacuum container by using the vacuum blender according to the fourth embodiment of the present disclosure.

The fourth embodiment is different from the third embodiment in that the opposite end of the container connector 133 is detachably coupled to and communicated with the opposite end of the first air passage part 131.

To achieve this, a locking/unlocking member for detachable coupling may be separately provided at the opposite end of the container connector 133 and/or the first air passage part 131, and coupling and separation may be made by a magnet.

In this way, because the container connector 133 and the first air passage part 131 are communicated with each other by directly connecting the opposite end of the container connector 133 to the opposite end of the first air passage part 131, it is not necessary to vacuum the entire space in the interior of the intermediate chamber 115 during the operation of the vacuum pump 111, and thus the vacuuming time of the mixer container 120 may be shortened.

Meanwhile, in a state, in which the opposite end of the container connector 133 is coupled to the opposite end of the first air passage part 131, it is necessary to perfectly seal the space with a sealant or the like such that air is not leaked through the space.

However, an aperture may be possibly formed between the opposite end of the container connector 133 and the opposite end of the first air passage part 151, which are coupled to each other, so that the air may be introduced and discharged through the aperture, and to achieve this, a sealing member 116 that opens and closes the interior of the intermediate chamber 115 to and from the outside may be further included.

Then, of course, the sealant is disposed between the intermediate chamber 115 and the sealing member 116 such that the interior of the intermediate chamber 115 is completely sealed from the outside when the sealing member 116 closes the intermediate chamber 115.

In this way, in the embodiment, because dual sealing is made, introduction and discharge of the air through the connection portion of the container connector 133 and the first air passage part 131 may be further prevented.

The other items are the same as or similar to the third embodiment, and a detailed description thereof will be omitted.

Fifth Embodiment

Figure 16:
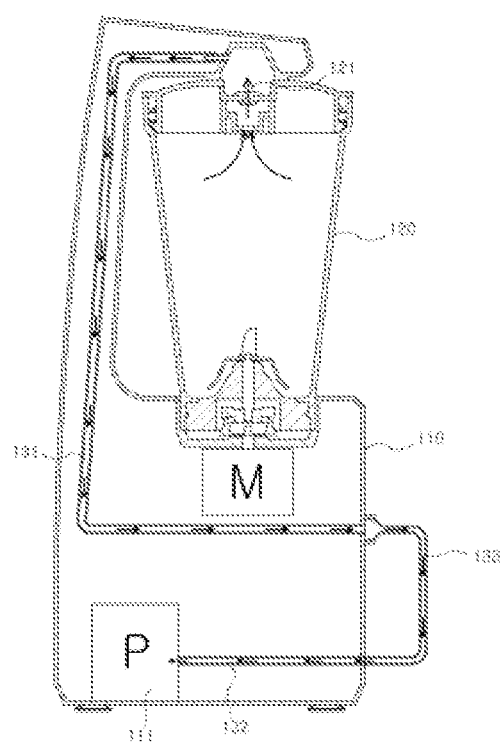
FIG. 16 is a cross-sectional view illustrating a process of vacuuming a mixer container by using a vacuum blender according to a fifth embodiment of the present disclosure.
Figure 17:
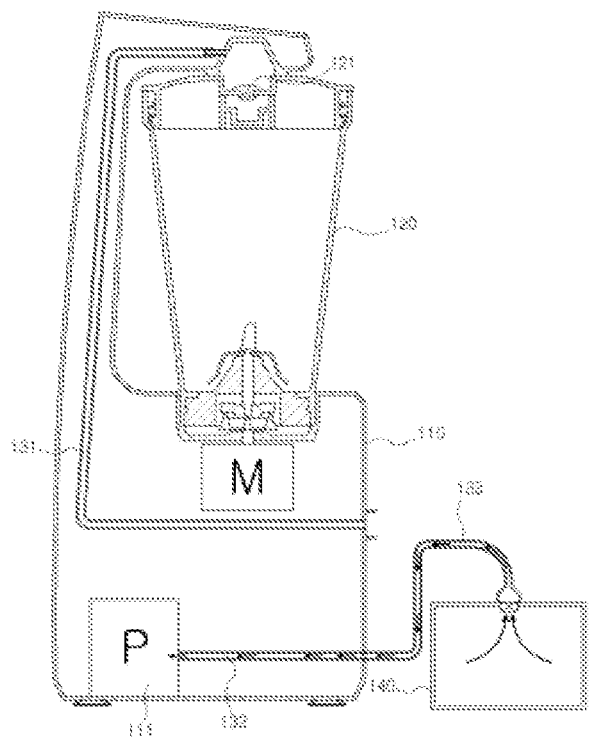
FIG. 17 is a cross-sectional view illustrating a process of vacuuming an external vacuum container by using the vacuum blender according to the fifth embodiment of the present disclosure.

FIG. 16 is a cross-sectional view illustrating a process of vacuuming a mixer container by using a vacuum blender according to a fifth embodiment of the present disclosure FIG. 17 is a cross-sectional view illustrating a process of vacuuming an external vacuum container by using the vacuum blender according to the fifth embodiment of the present disclosure.

The fifth embodiment is different from the third embodiment in that there is no intermediate chamber 115.

The first air passage part 131 is mounted in the interior of the body 110, and one end of the first air passage part 131 is communicated with the mixer container 120.

An opposite end of the first air passage part 131 is exposed to the outside of the body 110.

Further, an opposite end of the first air passage part 132 also is exposed to the outside of the body 110.

The one end of the container connector 133 is fixedly coupled to or detachably coupled to the opposite end of the second air passage part 132.

The opposite end of the container connector 133 may be detachably coupled to and communicated with the opposite end of the first air passage part 131 exposed to the outside in the body 110.

To achieve this, a locking/unlocking member for detachable coupling may be separately provided at the opposite end of the container connector 133 and/or the first air passage part 131, and coupling and separation may be made by a magnet.

It is apparent that a separate plug for blocking the opposite end of the first air passage part 131, which is exposed to the outside and opened, and the opposite end of the second air passage part 132 is included.

In this way, the container connector 133 and the first air passage part 131 are communicated with each other by directly connecting the opposite end of the container connector 133 to the opposite end of the first par passage part 131, which is exposed to the outside, whereby the interior of the mixer container 120 may be vacuumed during the operation of the vacuum pump 111, or the interior of the vacuum container 140 may be vacuumed by coupling the opposite end of the container connector 133 to the vacuum container 140.

The other items are the same as or similar to the third embodiment, and a detailed description thereof will be omitted.

The vacuum blender of the present disclosure is not limited to the above-described embodiments, and may be variously modified within a range that is allowed by the technical sprit of the present disclosure.

INDUSTRIAL APPLICABILITY

The present disclosure can be applied to a blender having a vacuuming function, and thus is industrially applicable.

The invention claimed is:

1. A vacuum blender comprising:
a body, in which a motor and a vacuum pump are mounted in an interior thereof;
a mixer container coupled to an upper portion of the body and configured to accommodate foods in an interior thereof;
a first air passage part, one end of which is communicated with the interior of the mixer container;
a second air passage part, one end of which is communicated with the vacuum pump; and
a container connector, one end of which is connected to an opposite end of the second air passage part,
wherein an opposite end of the container connector is selectively coupled to and communicated with a vacuum container or communicated with an opposite end of the first air passage part; and
wherein the vacuum blender further comprises:
an intermediate chamber formed in the body; and
a sealing member configured to open and close an interior of the intermediate chamber to and from an outside,
wherein the interior of the intermediate chamber is interrupted from the outside and an opposite end of the container connector disposed in the interior of the intermediate chamber is communicated with an opposite end of the first air passage part in a state, in which the sealing member closes the interior of the intermediate chamber.

2. The vacuum blender of claim 1, wherein an opposite end of the first air passage part and an opposite end of the second air passage part are formed in the interior of the intermediate chamber to be communicated with each other,
wherein an end of the container connector is connected to an opposite end of the second air passage part in the interior of the intermediate chamber, and
wherein an opposite end of the container connector is extracted from the intermediate chamber and is coupled to or communicated with an external vacuum container, or is disposed in the interior of the intermediate chamber to be communicated with an opposite end of the first air passage part through the intermediate chamber in a closed state of the sealing chamber.

3. The vacuum blender of claim 2, wherein an opposite end of the container connector and an opposite end of the first air passage part are spaced apart from each other in a state, in which one end and an opposite end of the container connector are disposed in the interior of the intermediate chamber.

4. The vacuum blender of claim 1, further comprising:
a reel member, on which the container connector is wounded.

5. The vacuum blender of claim 1, wherein an opposite end of the container connector is detachably coupled to and communicated with an opposite end of the first air passage part.

6. The vacuum blender of claim 5, further comprising:
an intermediate chamber formed in the body,
wherein an opposite end of the first air passage part and an opposite end of the second air passage part are formed in the interior of the intermediate chamber to be communicated with each other,
wherein the container connector is disposed in the interior of the intermediate chamber, and
wherein an opposite end of the container connector is extracted from the intermediate chamber to be coupled to or communicated with an external vacuum container, or is coupled to and communicated with the first air passage part in the interior of the intermediate chamber.

7. The vacuum blender of claim 6, further comprising:
a sealing member configured to open and close an interior of the intermediate chamber to and from an outside.

8. The vacuum blender of claim 5, wherein the first air passage part is mounted in an interior of the body and one end thereof is communicated with the mixer container, wherein an opposite end of the first air passage part is exposed to an outside of the body, and
wherein an opposite end of the container connector is detachably coupled to and communicated with an opposite end of the first air passage part exposed from the body to the outside.

9. A vacuum blender comprising:
a body, in which a motor and a vacuum pump are mounted in an interior thereof;
a mixer container coupled to an upper portion of the body and configured to accommodate foods in an interior thereof;
a first air passage part, one end of which is communicated with the interior of the mixer container;
a second air passage part, one end of which is communicated with the vacuum pump;
an intermediate chamber formed in the body, and in which an opposite end of the first air passage part and an opposite end of the second air passage part are communicated with an interior thereof;
a sealing member configured to open and close the interior of the intermediate chamber to the outside; and
a container connector detachably coupled to an opposite end of the second air passage part,
wherein an opposite end of the first air passage part and an opposite end of the second air passage part are communicated with each other through the intermediate chamber in a state, in which the container connector is separated to deviate from the intermediate chamber and the sealing member is closed, and
wherein an opposite end of the container connector, one end of which is coupled to an opposite end of the second air passage part is coupled to and communicated with an external vacuum container.

\* \* \* \* \*